(12) United States Patent
Yim

(10) Patent No.: US 7,229,210 B2
(45) Date of Patent: Jun. 12, 2007

(54) SELF-STANDING FISH TANK THERMOMETER

(76) Inventor: Sang Il Yim, 3730 W. Century Blvd., #3, Inglewood, CA (US) 90303

( * ) Notice: Subject to any disclaimer, the term of this patent is extended or adjusted under 35 U.S.C. 154(b) by 13 days.

(21) Appl. No.: 11/136,332

(22) Filed: May 23, 2005

(65) Prior Publication Data

US 2006/0262830 A1    Nov. 23, 2006

(51) Int. Cl.
*G01K 1/14* (2006.01)
(52) U.S. Cl. ............... 374/208; 374/141; 116/216
(58) Field of Classification Search ........... 374/148, 374/208, 147, 170, 156, 141; 116/216
See application file for complete search history.

(56) References Cited

U.S. PATENT DOCUMENTS

| | | | | |
|---|---|---|---|---|
| 2,180,995 A | * | 11/1939 | Nurnberg | 73/449 |
| 2,641,930 A | * | 6/1953 | Kebbon | 374/156 |
| 2,879,666 A | * | 3/1959 | Brown | 374/194 |
| 3,656,345 A | * | 4/1972 | Ingram | 73/170.34 |
| 3,961,531 A | * | 6/1976 | Peng | 374/208 |
| 4,169,378 A | * | 10/1979 | DiMarchi et al. | 374/156 |
| 4,169,382 A | * | 10/1979 | Goldman et al. | 374/194 |
| 5,152,610 A | * | 10/1992 | Hallett | 374/156 |
| 5,169,236 A | * | 12/1992 | Iest | 374/156 |
| 5,988,109 A | * | 11/1999 | Rofen | 119/245 |
| 6,422,746 B1 | * | 7/2002 | Weiss et al. | 374/156 |
| 6,794,990 B2 | * | 9/2004 | Tseng | 340/584 |
| 2002/0112303 A1 | * | 8/2002 | Hanson | 15/220.2 |

FOREIGN PATENT DOCUMENTS

| | | | | |
|---|---|---|---|---|
| JP | 60242327 A | * | 12/1985 | |
| JP | 11211573 A | * | 8/1999 | |
| SU | 799696 B | * | 1/1981 | |
| SU | 1761068 A1 | * | 9/1992 | |

\* cited by examiner

*Primary Examiner*—Gail Verbitsky
(74) *Attorney, Agent, or Firm*—Raymond Y. Chan; David and Raymond Patent Group

(57) ABSTRACT

A self-standing aquarium thermometer includes an impermeable self-standing housing disposed within an aquarium containing a predetermined volume of water, the self-standing housing has a lower cavity for receiving a weighting element, which has a predetermined weight for overcoming a floating force of the self-standing housing ensuring the self-standing housing downwardly sunk into a bottom of the aquarium, a thermometer unit received within the self-standing housing in an air-tight manner, the temperature display unit includes a temperature sensor having a sensor probe exposed into the aquarium for monitoring a temperature of the, a display screen for indicating the temperature, so that when such thermometer is disposed with the aquarium, the temperature of the water would be easily viewed through a glass wall of the aquarium.

16 Claims, 3 Drawing Sheets

SELF-STANDING FISH TANK THERMOMETER

BACKGROUND OF THE PRESENT INVENTION

1. Field of Invention

The present invention relates to thermometers for monitoring the temperature of an aquarium, more particularly, relates to a kind of self-standing aquarium thermometer supplemented with positioning device, so that a user is able to externally and separately shifting the thermometer within the aquarium for checking a temperature variance.

2. Description of Related Arts

Commonly, it is vitally crucial to maintain the water temperature of an aquarium at a stable and appropriate level for the fishes to survive. This is particularly true of tropical fishes being sensitive to the temperature variations. Such kinds of fishes are not adapted to be exposed to sudden temperature changes. Preferably, an appropriate water temperature range for tropical fishes is between 22–30° C. Because of these problems, many forms of aquarium tanks are equipped with circulating system, heating and cooling means for constantly maintaining a stable temperature of water contained in the aquarium.

However, the water temperature of the aquarium could be affected by a variety of factors, such as climates, aquarium set up location, electricity connection, power of the filtration, and illumination system, etc. In most of cases, the aquarium tanks are equipped with the external electrical means for controlling the water temperature at an appropriate level. However, during the heating or cooling process, the water temperature of the tank is not evenly distributed. To make an overall temperature check, the user has to shift the thermometer from place to place within the aquarium for monitoring the temperature.

Conventionally, the widely used thermometers are of immersible mode. And such thermometer is devised to hang over a side wall of the aquarium, or removeably attached to a side wall of the aquarium tank via rubber suction cup. Unfortunately, once the user wishes to check the water temperature of the aquarium, he or she has to open the top cover of the aquarium tank, and then extend his or her hand into the water to remove the suction cup and displace the thermometer into desirable position to check the temperature variance. This is due to the fact that the thermometer only measures the temperature where the sensing probe of the thermometer is positioned. Needlessly to say, the user's hand would contaminate the water and scare the fishes unnecessarily.

On the other hand, the aquarium cover is always connected with power source, so that it is highly possible the wetted hand would be shocked by the electricity thus causing unnecessary injury and agony. What is more, the rubber is susceptible to be aged and degraded, so that the suction force of the suction cup would have been gradually diminished and fallen off from the side wall. It is noted once the thermometer is sunk into the bottom of the aquarium tank, the temperature checking and monitoring process would be rather difficult.

SUMMARY OF THE PRESENT INVENTION

A primary object of the present invention is to provide a self-standing aquarium thermometer, which is capable of uprightly standing within an aquarium without any supplemental attaching device, so that user could conveniently displace such thermometer within the aquarium tank.

Another object of the present invention is to provide a self-standing aquarium thermometer having a temperature display screen, which is easily viewed from the outside of the aquarium.

Another object of the present invention is to provide a self-standing aquarium thermometer, having an external maneuvering member, which is located at the outside of the aquarium, wherein the maneuvering member and the thermometer are magnetically attractive, so that by shifting the maneuvering member along the aquarium tank, the thermometer positioned within the aquarium could be shifted for checking a temperature variance.

Another object of the present invention is to provide a self-standing aquarium thermometer, wherein both of the thermometer and maneuvering member are defined to have a rubbing layer, so that whenever the thermometer separately attached by the maneuvering member is shifted along the aquarium tank, the glass wall of aquarium sandwiched between the thermometer and the maneuvering member could be cleaned for cleanly revealing the temperature display screen.

Another object of the present invention is to provide a self-standing aquarium thermometer, wherein no complicated parts or structure are required to accomplishing above mentioned objects.

Accordingly, to achieve above mentioned objects, the preferred embodiment of the present invention introduces an A self-standing aquarium thermometer for an aquarium having a glass wall, comprising:

a self-standing housing having a bottom cavity and a front side defining a display window thereon;

a weighting element disposed within the bottom cavity of the self-standing housing for providing a downward sinking force which is greater than a water floating force, wherein the self-standing housing is adapted for disposing in the aquarium to sink towards a bottom side thereof while the self-standing housing is positioned at an upright manner; and a thermometer unit, comprising:

a power supply sealedly received in the self-standing housing;

a temperature sensor having a sensor probe outwardly protruded from the self-standing housing for monitoring a water temperature of the aquarium; and a temperature display which is electrically connected to said power supply and is sealedly received in the self-standing housing at a position aligned with the display window for displaying the water temperature of the aquarium, such that when the self-standing housing is retained at an upright orientation, the water temperature is shown at the display window and is adapted to be visible from outside through the glass wall.

These and other objectives, features, and advantages of the present invention will become apparent from the following detailed description, the accompanying drawings, and the appended claims.

DETAILED DESCRIPTION OF THE PREFERRED EMBODIMENT

Figure 1:
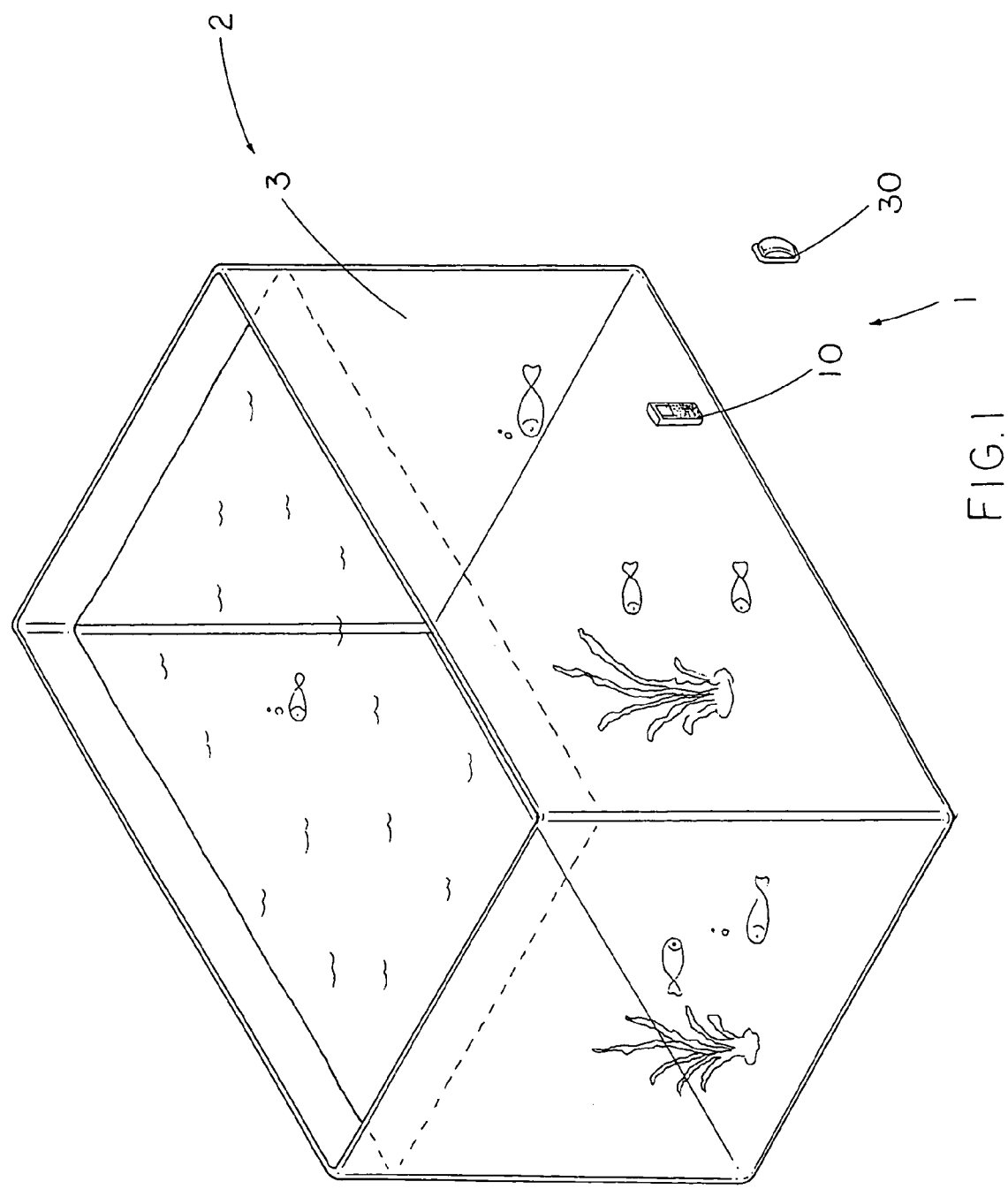
FIG. 1 is a perspective view of a self-standing aquarium thermometer according to the preferred embodiment of the present invention.
Figure 2:
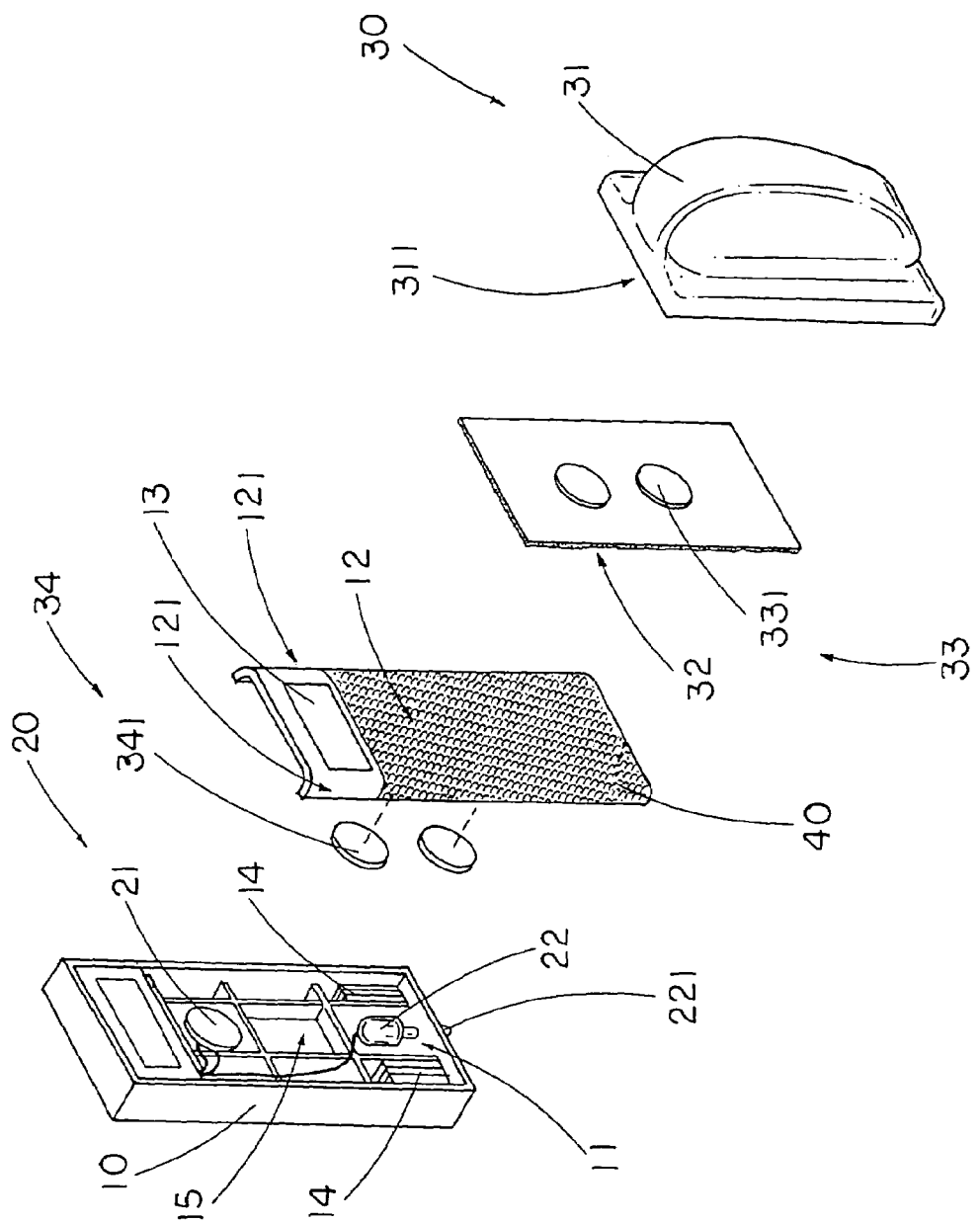
FIG. 2 is an exploded view of the self-standing aquarium thermometer according to the above preferred embodiment of the present invention.
Figure 3:
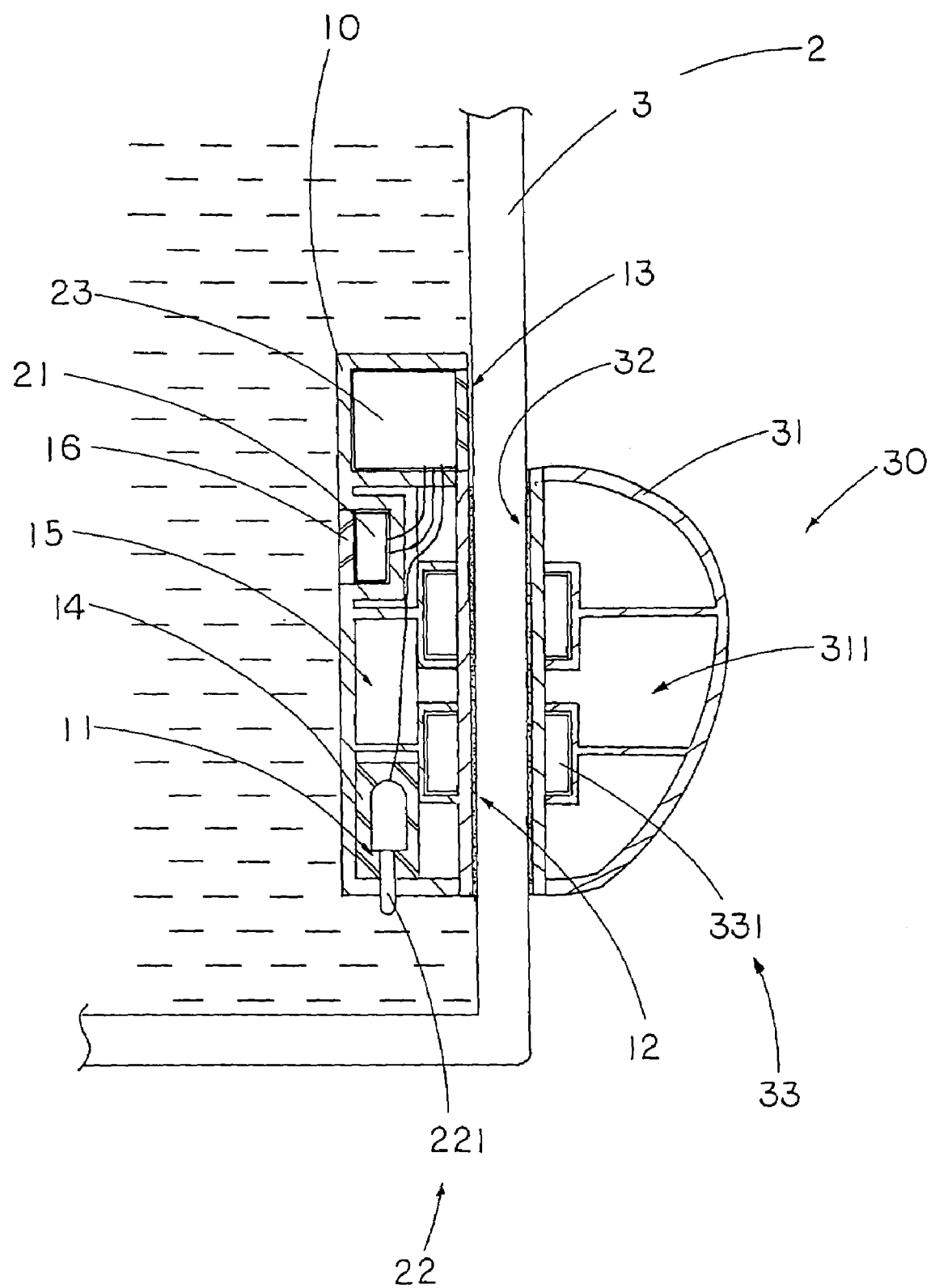
FIG. 3 is a sectional view of the self-standing aquarium thermometer, showing the self-standing housing and magnetic holder are oppositely attracting with each other so as to sandwich the glass wall of the aquarium therebetween.

Referring to FIG. 1 to FIG. 3, a self-standing aquarium thermometer 1 according to the preferred embodiment of the present invention is illustrated. The thermometer 1 is purposed to check a temperature variance of an aquarium 2 which has a glass wall 3. Here, the thermometer 1 comprises a self-standing housing 10, which is supposed to be impermeably disposed within the aquarium 2 containing a predetermined volume of water, the self-standing housing 10 has a bottom cavity 11 and a front side 12 defining a display window 13 thereon.

The thermometer 1 further comprises a weighting element 14 disposed within the bottom cavity 11 of the self-standing housing 10 for providing a downward sinking force which is greater than a water floating force, wherein the self-standing housing 10 is adapted for disposing in the aquarium 2 to sink towards a bottom side 15 thereof while the self-standing housing 10 is positioned at an upright manner.

In addition, the thermometer 1 comprises a thermometer unit 20 comprising a power supply 21 sealedly received in the self-standing housing 10, a temperature sensor 22 having a sensor probe 221 outwardly protruded from the self-standing housing for monitoring a water temperature of the aquarium 2, and a temperature display 23 which is electrically connected to the power supply 21 and is sealedly received in the self-standing housing 10 at a position aligned with the display window 13 for displaying the water temperature of the aquarium 2, such that when the self-standing housing 10 is retained at an upright orientation, the water temperature is shown at the display window 13 and is adapted for being seen from outside of the aquarium 2 through the glass wall 3.

According to the present invention, the weighting element 14 is provided at a relatively lower position at the bottom cavity 11 and preferably, the weighting element 14 has a predetermined weight for overcoming a floating force of the self-standing housing 10 so as to enable the self-standing housing 10 sunk into the bottom of the aquarium 2 and stand in the aquarium 2 with an upright manner.

It is noted that the self-standing housing 10 is impermeably embodied and immersible, and more importantly, an air chamber 15 is formed at a position above the bottom cavity 11 for providing an upward floating force against the sinking force such that the self-standing housing 10 is allowed for sinking towards the bottom side of the aquarium at the upright orientation.

According to the present invention, the impermeable self-standing housing housing 10 is adapted to receive a printed circuit board for electrically and digitally supporting the thermometer unit 20 to indicate the temperature of the water ambient to the sensor probe 221. That is to say, the temperature display 23 and the temperature sensor 22 are electrically operative through the printed circuit board. Preferably, the sensor probe 221 of the temperature sensor 22 is defined penetrating a bottom wall of the support housing 10 for detecting the water temperature ambient to the lower portion of the self-standing housing 10. This is due to the fact that for detecting a temperature variance of the very deepness of such aquarium, the conventional thermometer had to be inserted rather deeper inside of the aquarium. Unfortunately, in case of an aquarium was profoundly deep, reading such thermometer would be difficult. Moreover, the downwardly projected sensor probe 221 could be embodied as pivotal point for uprightly sustaining the self-standing housing 10 stand within the aquarium 2 with a balanced manner.

Preferably, the weighting element 14 is provided at a very end portion of the lower cavity 11 for providing the downward sinking force to the impermeable self-standing housing 10. Since the self-standing housing 10 is sealed with an air-tight manner, the floating force of the air chamber 15 of the self-standing housing 10 would be considerable. Therefore, the weighting element 14, having a predetermined weight, would offset such floating force enabling the self-standing housing 10 standing in the water with an upright and balanced manner.

As shown in FIG. 2 and FIG. 3, the thermometer 1 further comprises a magnetic holder 30 magnetically attached to the self-standing housing 10, wherein the magnetic holder 30 comprises a holder body 31 having a receiving cavity 311 and a guiding surface 32, a first magnetic member 33 received in the receiving cavity 311, and a second magnetic member 34 sealedly received in the self-standing housing 10 and arranged to magnetically attract to the first magnetic member 34 for sandwiching the glass wall 3 between the guiding surface 32 of the holder body 31 and the front side 12 of the self-standing housing 10, such that the holder body 31 is adapted for sliding on the glass wall 3 to selectively adjust a position of the self-standing housing 10 on the glass wall 3.

Here, the magnetic holder 30 could be applied as a shifting handle disposed at outside of the aquarium 2 for separately managing a displacement of the self-standing housing 10 within the aquarium 2 so as to detect a temperature variance of the water. According the preferred embodiment of the present invention, the first magnetic member 33 has a first pair of spaced first magnetic elements 331 defined on the guiding surface 32, and the second magnetic member 34 has a second pair of spaced second magnetic elements 341 correspondingly mating with the first pair of magnetic elements 331 in a polarity reversed manner, so that when the guiding surface 32 of the magnetic holder 30 is disposed adjacent to the glass wall 3 of the aquarium 2, the self-standing housing 10 is capable of being automatically attracted to move towards the glass wall 3 of the aquarium 2 so as to sandwich the glass wall 3 between the guiding surface 32 and the front side 12, wherein by moving the magnetic holder 30 along the glass wall 3, the self-standing housing 10 is shifted as well for detecting the temperature variance.

It is worth to mention that first magnetic member 33 comprises two first magnetic elements 331 having opposite poles spacedly received in the holder body 31, wherein the second magnetic member 34 comprises two second magnetic elements 341 having opposite poles spacedly received in the self-standing housing 10 to substantially and magnetically attract to the first magnetic elements respectively, such that the magnetic holder 31 could provide a substantial guiding force to manage a temperature checking process. What is more, the reversed-polarity design poses another advantage in the present invention. For those traditional magnetic guiding device, only one magnetic element is disposed at respective side, detaching such magnetically coupled guiding partner would be laborious and difficult. According to the present invention, the reversed-polarity design enables the magnetic holder 31 and self-standing housing separately attracted and coupled in a tight manner.

Whenever a user wished to detach the magnetic holder 31 from the self-standing housing 10, he or she might merely rotate the magnetic holder 31 to snap the alignment between the first magnetic element 331 and the second magnetic element 341 to detach the magnetic holder 31.

In other words, the magnetic holder 30 has a guiding surface 32 which is adapted to oppositely face the front side 12 of the self-standing housing 10. In the preferred embodiment, the front side 12 is elongated shaped so that the spaced pair of second magnetic elements 341 is vertically defined on the self-standing housing 10. On the other hand, the magnetic holder 30, in turn, has another spaced pair of first magnetic elements 331 correspondingly matching with the second magnetic elements 341 defined on the elongated self-standing housing 10. So that when the guiding surface 32 of the magnetic holder 31 is placed to oppositely face the front side 12 of the self-standing housing 10 from the outside of the glass wall 3. Here, the first and second magnetic elements are ferrous or magnetic component. In short, by moving the magnetic holder 31 from the outside of the glass wall 3, the self-standing housing 10 inside the aquarium 2 would be displaced with the movement of the magnetic holder 31 synchronously.

That is to say, the thermometer 1 of the present invention is provided for positioning the thermometer, and for enabling the self-standing housing 10 horizontally with respect to the shifting handle 40. Furthermore, the positioning of the thermometer 1 is determined and managed from outside the aquarium 2. As a result, there is no need to insert a hand in the tank for displacing the thermometer 1 from one location to another. It is noted that the holder 31 further has a gripping portion 311 for facilitating the user maneuverability.

Preferably, the magnetic elements provided at the magnetic holder 30 and the self-standing housing 10 are permanent magnets. And the polarity respectively defined on the self-standing housing 10 and the magnetic holder 30 are reservedly defined for ensuring the self-standing housing 10 and the magnetic holder 30 tightly stuck on the two side of the glass wall 3 of the aquarium 2. Here, it is noted that the permanent magnet could be defined as neodymium ferroboron, or defined as the build-up magnet made of neodymium ferroboron and ferrum.

Furthermore, it is worth to mention that the self-standing housing 10 is made of materials having a density less than the density of water, therefore, once the impermeable self-standing housing 10 is broken, the self-standing housing 10 is still capable of uprightly standing at the bottom of the aquarium.

According to the preferred embodiment, the front side 12 is a side cover for sealedly enclosing the air chamber 15 and the lower cavity 11 in a water-tight manner, wherein the front side has a display window 13 correspondingly aligning with the temperature display 23 for exposing the temperature to outside.

The thermometer 1 further comprises two cleaning layers 40 provided on the guiding surface 32 of the holder body 31 and the front side 12 of the self-standing housing 10 respectively, such that when the holder body 31 drives the self-standing housing 10 for sliding on the glass wall 3, the cleaning layers 40 are adapted for cleaning the glass wall 3 to clearly display the water temperature at the display window 13 through the glass wall 3.

That is to say, both of the guiding surface 32 and the front side 12 are coated with a fabric layer, such as Velcro layers, so that during the temperature checking operation, during which the front side 12 of the self-standing housing 10 and the guiding surface 32 of the magnetic holder 31 are respectively stuck on the two sides of the glass wall 3 of the aquarium 2, the shifting process would simultaneously clean the glass wall 3 from inside and outside. That is to say, the thermometer 1 of the present invention is embodied as an efficient aquarium cleaner as well. Here, in case of the Velcro materials are used as the two cleaning layers 40, the hook side of the Velcro fastener is supposed to be defined on the inside of the aquarium 2. This is due to the fact the agglomerated dirt would be prone clogged on the inside wall of the aquarium.

As shown in the FIG. 2, the self-standing housing 10 further has two curving edges 121 integrally extended from two side edges of the front side 12 respectively for allowing the self-standing housing 10 to turn a corner of the aquarium. Moreover, the self-standing housing 10 further has a sealing cap 16 detachably attached to a rear wall of the self-standing housing 10 in a water tight manner to replace a replaceable battery of the power supply 21.

Furthermore, the thermometer unit 20 could be integrally mounted to the self-standing housing 10. Here, the thermometer could be selected from a group consisting of alcohol thermometer, mercury thermometer, and scale index thermometer, etc. It is worth to mention that the temperature sensor 22 and the temperature display 23 could be connected via live wire, infrared means, laser means, wireless connections and ultra sound waves.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A self-standing aquarium thermometer for an aquarium having a glass wall, comprising:
   a self-standing housing having a bottom cavity and a front side defining a display window thereon;
   a weighting element disposed within said bottom cavity of said self-standing housing for providing a downward sinking force which is greater than a water floating force, wherein said self-standing housing is adapted for disposing in said aquarium to sink towards a bottom side thereof while said self-standing housing is positioned at an upright manner, wherein said self-standing housing further has an air chamber formed at a position above said bottom cavity for providing an upward floating force against said sinking force such that said self-standing housing is allowed for sinking towards said bottom side of said aquarium at an upright orientation; and
   a thermometer unit, comprising:
   a power supply sealedly received in said self-standing housing;
   a temperature sensor having a sensor probe outwardly protruded from said self-standing housing for monitoring a water temperature of said aquarium; and
   a temperature display which is electrically connected to said power supply and is sealedly received in said self-standing housing at a position aligned with said display window for displaying said water temperature of said aquarium, such that when said self-standing housing is retained at said upright orientation, said water temperature is shown at said display window and is adapted for being seen from an exterior of said aquarium through said glass wall.

2. The self-standing aquarium thermometer, as recited in claim 1, further comprising a magnetic holder magnetically attached to said self-standing housing, wherein said magnetic holder comprises a holder body having a receiving cavity and a guiding surface, a first magnetic member received in said receiving cavity, and a second magnetic member sealedly received in said self-standing housing and arranged to magnetically attract to said first magnetic member for sandwiching said glass wall between said guiding surface of said holder body and said front side of said self-standing housing, such that said holder body is adapted for sliding on said glass wall to selectively adjust a position of said self-standing housing on said glass wall.

3. The self-standing aquarium thermometer, as recited in claim 2, wherein said first magnetic member comprises two first magnetic elements having opposite poles spacedly received in said holder body, wherein said second magnetic member comprises two second magnetic elements having opposite poles spacedly received in said self-standing housing to magnetic attract to said first magnetic elements respectively, such that said magnetic holder substantially guides said self-standing housing for sliding on said glass wall.

4. The self-standing aquarium thermometer, as recited in claim 1, further comprises two cleaning layers provided on said guiding surface of said holder body and said front side of said self-standing housing respectively, such that when said holder body drives said self-standing housing for sliding on said glass wall, said cleaning layers are adapted for cleaning said glass wall to clearly display said water temperature at said display window through said glass wall.

5. The self-standing aquarium thermometer, as recited in claim 2, further comprises two cleaning layers provided on said guiding surface of said holder body and said front side of said self-standing housing respectively, such that when said holder body drives said self-standing housing for sliding on said glass wall, said cleaning layers are adapted for cleaning said glass wall to clearly display said water temperature at said display window through said glass wall.

6. The self-standing aquarium thermometer, as recited in claim 3, further comprises two cleaning layers provided on said guiding surface of said holder body and said front side of said self-standing housing respectively, such that when said holder body drives said self-standing housing for sliding on said glass wall, said cleaning layers are adapted for cleaning said glass wall to clearly display said water temperature at said display window through said glass wall.

7. The self-standing aquarium thermometer, as recited in claim 2, wherein said sensor probe of said temperature sensor is downwardly protruded from a bottom wall of said self-standing housing for monitoring said water temperature of said aquarium at said bottom side thereof which is the deepness of said aquarium.

8. The self-standing aquarium thermometer, as recited in claim 4, wherein said sensor probe of said temperature sensor is downwardly protruded from a bottom wall of said self-standing housing for monitoring said water temperature of said aquarium at said bottom side thereof which is the deepness of said aquarium.

9. The self-standing aquarium thermometer, as recited in claim 6, wherein said sensor probe of said temperature sensor is downwardly protruded from a bottom wall of said self-standing housing for monitoring said water temperature of said aquarium at said bottom side thereof which is the deepness of said aquarium.

10. The self-standing aquarium thermometer, as recited in claim 2, wherein said self-standing housing further has two curving edges integrally extended from two side edges of said front side respectively for allowing said self-standing housing to turn a corner of said aquarium.

11. The self-standing aquarium thermometer, as recited in claim 4, wherein said self-standing housing further has two curving edges integrally extended from two side edges of said front side respectively for allowing said self-standing housing to turn a corner of said aquarium.

12. The self-standing aquarium thermometer, as recited in claim 9, wherein said self-standing housing further has two curving edges integrally extended from two side edges of said front side respectively for allowing said self-standing housing to turn a corner of said aquarium.

13. The self-standing aquarium thermometer, as recited in claim 2, wherein said self-standing housing further has a sealing cap detachably attached to a rear wall of said self-standing housing in a water tight manner to replace a replaceable battery of said power supply.

14. The self-standing aquarium thermometer, as recited in claim 9, wherein said self-standing housing further has a sealing cap detachably attached to a rear wall of said self-standing housing in a water tight manner to replace a replaceable battery of said power supply.

15. The self-standing aquarium thermometer, as recited in claim 12, wherein said self-standing housing further has a sealing cap detachably attached to a rear wall of said self-standing housing in a water tight manner to replace a replaceable battery of said power supply.

16. A self-standing aquarium thermometer for an aquarium having a glass wall, comprising:
   a self-standing housing having a bottom cavity and a front side defining a display window thereon;
   a weighting element disposed within said bottom cavity of said self-standing housing for providing a downward sinking force which is greater than a water floating force, wherein said self-standing housing is adapted for disposing in said aquarium to sink towards a bottom side thereof while said self-standing housing is positioned at an upright manner; and
   a thermometer unit, comprising:
   a power supply sealedly received in said self-standing housing;
   a temperature sensor having a sensor probe outwardly protruded from said self-standing housing for monitoring a water temperature of said aquarium;
   a temperature display which is electrically connected to said power supply and is sealedly received in said self-standing housing at a position aligned with said display window for displaying said water temperature of said aquarium, such that when said self-standing housing is retained at an upright orientation, said water temperature is shown at said display window and is adapted for being seen from an exterior of said aquarium through said glass wall;
   a magnetic holder magnetically attached to said self-standing housing, wherein said magnetic holder comprises a holder body having a receiving cavity and a guiding surface, a first magnetic member received in said receiving cavity, and a second magnetic member sealedly received in said self-standing housing and arranged to magnetically attract to said first magnetic member for sandwiching said glass wall between said guiding surface of said holder body and said front side of said self-standing housing, such that said holder body is adapted for sliding on said glass wall to selectively adjust a position of said self-standing housing on said glass wall; and two cleaning layers provided on said guiding surface of said holder body and said front side of said self-standing housing respectively, such that when said holder body drives said self-standing housing for sliding on said glass wall, said cleaning layers are adapted for cleaning said glass wall to clearly display said water temperature at said display window through said glass wall.

* * * * *